United States Patent

Bailey et al.

[11] Patent Number: 5,875,676
[45] Date of Patent: Mar. 2, 1999

[54] NON COLOCATED RATE SENSING FOR CONTROL MOMENT GYROSCOPES

[75] Inventors: David A. Bailey, Glendale; Christopher J. Heiberg, Peoria, both of Ariz.

[73] Assignee: Honeywell Inc., Minneapolis, Minn.

[21] Appl. No.: 922,224

[22] Filed: Sep. 2, 1997

[51] Int. Cl.$^6$ .............................. B64G 1/28; G01C 19/02
[52] U.S. Cl. .............................. 74/5.22; 74/5.34; 74/5.4; 244/165
[58] Field of Search .............................. 74/5.34, 5.4, 5.22, 74/5.6 R, 5.6 A; 244/165; 73/504.09

[56] References Cited

U.S. PATENT DOCUMENTS

| | | | |
|---|---|---|---|
| 3,741,500 | 6/1973 | Liden | 74/5.34 X |
| 4,294,420 | 10/1981 | Broquet | 244/165 |
| 5,692,707 | 12/1997 | Smay | 244/165 |

*Primary Examiner*—Rodney H. Bonck
*Attorney, Agent, or Firm*—Charles J. Ungemach

[57] ABSTRACT

A feedback system for use in controlling control moment gyroscopes that are used in positioning a spacecraft where the relative rate of rotation is determined from the difference between the rotation rate of the gimbals of the CMGs and the rotation rate of the frame about the gimbal axis. The inertial reference units on the spacecraft are utilized as the source of measured rates of rotation of the three spacecraft axes with respect to a predetermined axis and these are converted to the rates of rotation of the frame about the individual CMG gimbal axes.

14 Claims, 1 Drawing Sheet

NON COLOCATED RATE SENSING FOR CONTROL MOMENT GYROSCOPES

CROSS REFERENCE TO RELATED APPLICATIONS

U.S. patent application entitled Relative Rate Sensor for Control Moment Gyroscopes, of Gerald K. Foshage, Ser. No. 08/821142 filed Mar. 19, 1997 and assigned to the assignee of the present invention.

BACKGROUND OF INVENTION

1. Field of the Invention

This invention relates to the production of feedback signals indicative of the rate of rotation of a system, such as a space craft for use in controlling a torque applied to the space craft with drive devices such as control moment gyros (CMGs).

2. Description of the Prior Art:

CMGs are well known in the art for use in controlling the torque applied to a space craft to control its orientation or rate of rotation with respect to reference axis or to another body such as earth. For example, a satellite in space may have its rate of rotation controlled about one or more axes (usually three) by fixing the gimbal frames of one or more CMGs (usually four to provide redundancy) to the frame of the spacecraft and applying a command rate to the gimbals of the CMGs which then create torques which are transferred to the frame of the spacecraft to obtain the desired rotation rate. In such systems it is desirable to provide closed loop feedback for better control by assuring that the actual rates are the same as the commanded rates. Such systems have employed tachometers to supply a signal indicative of the relative rate of rotation between the gimbal frame and the inner gimbal assembly. However, tachometers have greater size and weight than is desired, have low rate threshold (the signals can't be discerned from the noise), have variable rate ripple (voltage that varies without change in gimbal rate) and must be mounted colinearly with the gimbal. A better system has been described in the above referenced Foshage application where a pair of fiber optic gyros are employed, one to measure the absolute rate of rotation of the inner gimbal assembly and one to measure the absolute rate of rotation of the frame attached to the spacecraft. While this system provides excellent rate control, it requires the use of two separate absolute rate sensors (e.g. fiber optic gyros).

SUMMARY OF THE INVENTION

The present invention eliminates the need for one of the absolute rate sensors of the above referenced Foshage application by utilizing the outputs of the inertial reference units i.e., rate gyroscopes, (e.g. ring laser gyros) which are used on the spacecraft. The output of the spacecraft inertial reference units is transformed from three axis signals having reference to the space craft frame to signals relative to the axes of the CMG which is then subtracted from the absolute CMG gimbal rates determined by the absolute rate sensors mounted on the rotating CMG gimbals to provide relative rate feedback signals, as in the above referenced Foshage application.

DETAILED DESCRIPTION OF THE PREFERRED EMBODIMENTS

Figure 1:
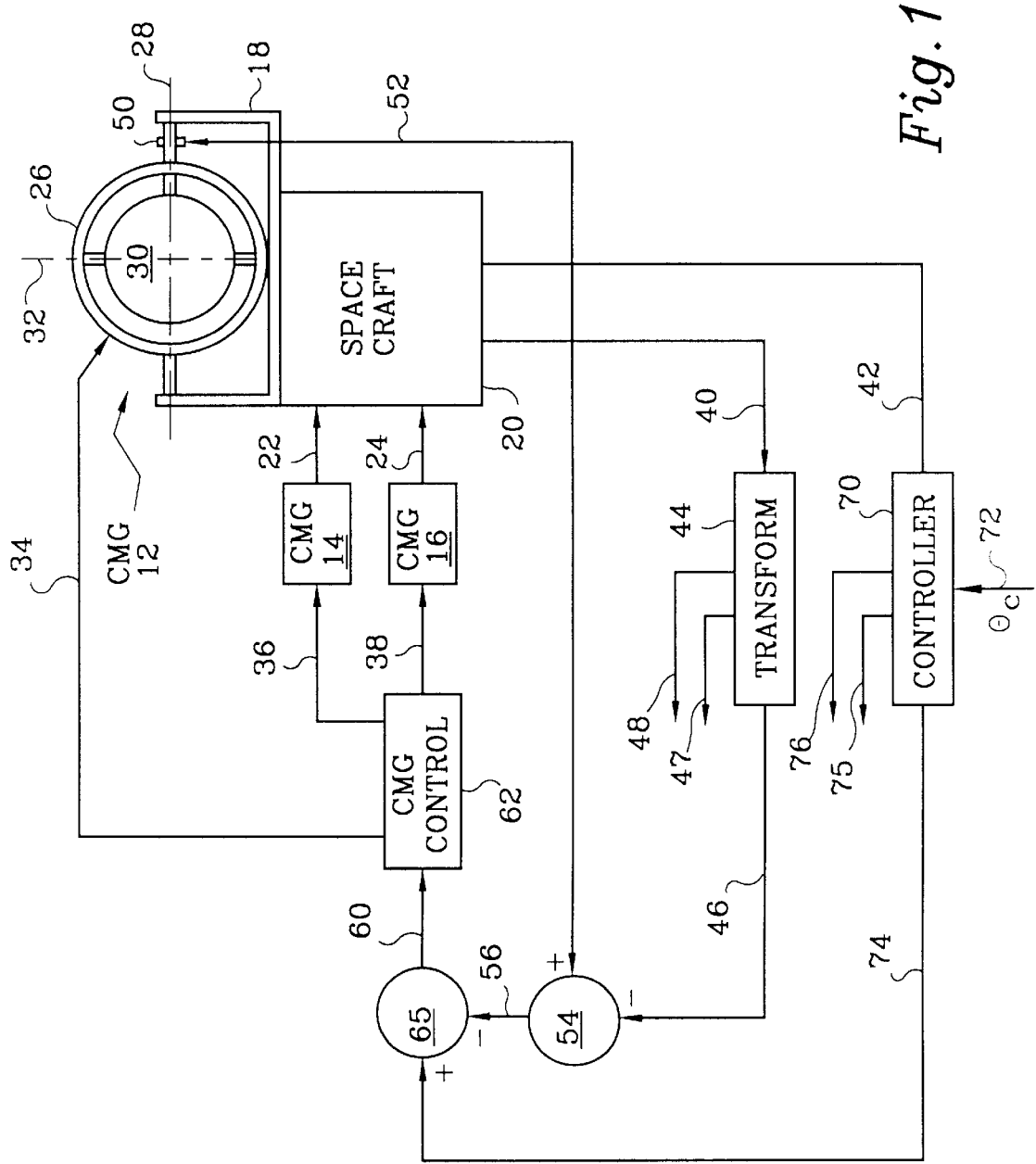
FIG. 1 is a schematic block diagram of the system of the present invention

In FIG. 1, three CMGs 12, 14 and 16 are shown. A gimbal frame 18 for CMG 12 is shown mounted on spacecraft 20 and torque exerted on frame 18 will be transferred to spacecraft 20. CMGs 14 and 16 are also mounted on space craft 20 but, for convenience, only CMG 12 is so shown in FIG. 1. The torques exerted by CMGs 14 and 16 are shown by arrows 22 and 24 respectively. While 3 CMGs are shown, it should be understood that for redundancy, four or more such gyros are usually used.

The gimbal frame 18 of CMG 12 extends upwardly in FIG. I to provide a mount for a gimbal 26 for rotation about an axis 28. Gimbal 26 provides a mount for a rotor 30 to be rotatably driven by motive means (not shown) about an axis 32. A torque applied to gimbal 26 as, for example, by a connection shown as arrow 34, will cause a torque to be applied to gimbal frame 18 and thus to spacecraft 20 to cause rotation of spacecraft 20 about a first predetermined axis. Similarly, torques applied to the gimbals of CMG 14 and CMG 16 as, for example by connections shown as arrows 36 and 38 will produce torques by arrows 22 and 24 to be applied to spacecraft 20 about second and third predetermined axes respectively. In this manner, the rotation of spacecraft 20 may be controlled so that it will, for example, become or remain pointed in a predetermined direction or at a predetermined angle with respect to a reference axis.

The spacecraft 20 includes inertial reference sensors such as ring laser gyros and accelerometers which operate to produce signals relating to the spacecraft's rate of rotation about the inertial axes of the gyros and signals relating to the angular position of the spacecraft with respect to the reference axis. Signals indicative of the rate of rotation of the spacecraft are produced on a line 40 and those relating to angular position may be produced on a line 42 in FIG. 1. The rate of rotation signals on line 40 are with respect to a reference system on the spacecraft and accordingly, they are shown being presented to a TRANSFORM box 44 which, knowing the orientation of each of the three CMGs with respect to the spacecraft, operates to calculate the angular rates of rotation of the spacecraft about the gimbal axes of the CMGs 12, 14 and 16. In other words, using known math techniques such as Euler equations, the rate signals relative to one set of coordinates (the spacecraft's) are converted into rate signals relative to another set of coordinates (the CMGs). Accordingly, the TRANSFORM box will produce one output for each of the CMGs used, which output is indicative of the rate of the spacecraft rotation about that CMG's gimbal axis. This signal for CMG 12 is shown on a line 46 in FIG. 1. While the signals for CMGs 14 and 16 are shown on lines 47 and 48 respectively, for example. If more than three CMGs are used there would be additional signals from TRANSFORM box 44.

In FIG. 1, an absolute rate of rotation sensor 50, for example a fiber optic gyro, is shown mounted on gimbal 26 to produce a signal on a line 52 indicative of the rate of rotation of the gimbal 26 about the gimbal axis 28. Similar signals would be produced on lines (not shown) from CMGs 14 and 16.

As was the case in the Foshage application, the signal indicative of the rate of rotation of the frame about the gimbal axis and the signal indicative of the rate of rotation of the gimbal about the gimbal axis are subtracted in a circuit 54 wherein the gimbal rate signal is shown as positive and the frame rate signal is shown as negative. The difference is indicative of the relative rate of the CMG gimbal about its gimbal axis and is presented by the circuit 54 on a line 56 as a relative rate signal. Similar signals (not shown) would also be produced by other subtraction circuits for CMGs 14 and 16. The relative rate signal on line 56 may be used as a feedback signal for CMG 12, either directly or, as shown as being presented through a second summing circuit 58 and a line 60 to a control box 62. If the actual rate of rotation of the spacecraft 20 about the gimbal axes of CMGs 12, 14 and 16 are not the same as the desired rate of rotation of the gimbal about the gimbal axes as determined by the absolute rate sensors such as 50, then the feedback signals will operate through a control box 62 to produce a change the torque such as on connection 34 applied to the gimbals in such a way as to change the rate of rotation of the space craft until the two rate signals are equal and there is no feedback signal such as on connection 34.

Signals indicative of the angles between the axes of the spacecraft and some predetermined reference axis on line 42 are presented to CONTROLLER box 70 which also receives a signal on a line 72 indicative of a commanded or desired angle, $\Theta_c$. If the actual angle signals on line 42 are not the same as the desired angle signals on line 72, then CONTROLLER box 70 produces commanded relative rate signal on a line 74, for the CMG 12, and similar signals indicative of the commanded relative rate for CMGs 14 and 16 on lines 75 and 76. The signals indicative of commanded relative rate on lines such as 74, which occur when the actual angles of the spacecraft are not the same as the desired angles, are presented to the summing circuits such as 65 where the relative rate signals on lines such as 56 are subtracted therefrom to produce the feedback signals on lines such as 60 for the CMG CONTROL boxes such as 62. Thus, even when the commanded rates of rotation of the spacecraft and the gimbal are the same, signals on lines such as 74 will command that the spacecraft assume a new direction with respect to the predetermined direction and the CMGs will produce torques on their gimbals to change the space craft orientation. This will produce feedback signals on lines such as 60 until the rates of rotation are again satisfied and the new angle position is achieved, at which time the signals on lines such as 60 will go to zero.

It is seen that we have provided a feedback system for the CMGs of a spacecraft which is lighter and simpler than the prior art and is substantially as effective as the invention of the above mentioned Foshage application while eliminating one fiber optic gyro for each CMG. Many modification and changes will occur to those having ordinary skill in the art. For example, while three CMGs have been shown, any number may be employed and while the system has been shown for use on a spacecraft, any other applications requiring rate measurements and/or feedback may utilize the invention. We therefore do not wish to be limited to the specific embodiments used in connection with the description of the preferred embodiment.

The embodiments of the invention in which an exclusive property or right is claimed are defined as follows:

1. In a control system including a control moment gyro having at least one gimbal and at least one gimbal axis and a sensor for producing a first signal indicative of the rate of rotation of the gimbal about the gimbal axis, the control moment gyro being mounted on a movable member to produce a torque which causes rotation of the movable member about a predetermined axis, the movable member including sensing means for producing a second signal indicative of the rate of rotation of the movable member about the predetermined axis, the improvement comprising:

transforming means connected to receive the second signal and to produce a third signal which is indicative of the rate of rotation of the movable member about the gimbal axis;

means connected to receive the first and third signals and operable to produce a fourth signal indicative of the relative rate of rotation between the rate rotation of the gimbal about the gimbal axis and the rate of rotation of the movable member about the gimbal axis; and, feedback means connecting the control moment gyro to receive the fourth signal and to produce the torque in accordance therewith.

2. The system according to claim 1 wherein the movable member is a spacecraft.

3. The system according to claim 2 wherein the sensor for producing the first signal is an absolute rate sensor.

4. The system according to claim 3 wherein the absolute rate sensor is a fiber optic gyro.

5. The system according to claim 1 further including means producing a fifth signal indicative of a desired rate of rotation of the movable member about the gimbal axis, and means comparing the fourth and fifth signals to produce a feedback signal, the feedback means connecting the control moment gyro to receive the fourth signal and to produce the torque in accordance therewith.

6. The system according to claim 5 wherein the sensing means produces a sixth signal indicative of the angle between the predetermined direction and a reference direction and further including:

means producing a seventh signal indicative of a desired angle between the predetermined direction and the reference direction; and a controller connected to receive the sixth and seventh signals and operable to produce the fifth signal in accordance therewith.

7. The system according to claim 1 further including second and third control moment gyros each having a gimbal and a gimbal axis and a sensor for producing additional first signals indicative of the rate of rotation of the gimbal about the gimbal axis of the second and third control moment gyros respectively, the second and third control moment gyros being mounted on a movable member to produce a second and third torques which causes rotation of the movable member about second and third predetermined axes respectively, the movable member including sensing means for producing further second signals indicative of the rate of rotation of the movable member about the second and third predetermined axes respectively, and wherein the transforming means is connected to receive the further second signals and to produce further third signals indicative of the rate of rotation of the movable member about the gimbal axes of the second and third control moment gyros and wherein further fourth signals indicative of the relative rate of rotation between the rate rotation of the gimbal about the gimbal axes of the second and third control moment gyros and the rate of rotation of the movable member about the gimbal axes of the second and third control moment gyros are produced and the feedback means connects the second and third control moment gyros to receive the further fourth signals and to produce the second and third torques in accordance therewith.

8. The system according to claim 7 wherein the movable member is a spacecraft.

9. The system according to claim 8 wherein the sensors for producing the first signals are absolute rate sensors.

10. The system according to claim 9 wherein the absolute rate sensors are fiber optic gyros.

11. Apparatus for controlling movement of a spacecraft having inertial sensors which produce a first, second and third signals, each indicative of the rate of rotation of the craft about one of first, second and third axes respectively:

first, second and third control moment gyros, each having a gimbal frame mounted to the spacecraft, having a gimbal assembly mounted on the gimbal frame for rotation about a gimbal axis, and being operable in accordance with an input signal to produce a torque causing rotation of the spacecraft about one of the first, second and axes;

first, second and third sensing means operable to produce a fourth, fifth and sixth signals each indicative of the rate of rotation of the gimbal assembly of one of the first second and third control moment gyros about the gimbal axis thereof, transformation means connected to receive the first, second and third signals and to produce seventh, eighth and ninth signals, each indicative of the rate of rotation of the spacecraft about the gimbal axis of one of the first, second and third control moment gyros respectively;

first, second and third difference means each connected to receive one of the fourth, fifth and sixth signals and one of the seventh, eighth and ninth third signals respectively for producing tenth, eleventh and twelfth signals, each indicative of the difference between the rate of rotation of the gimbal assembly about the gimbal axis of one of the first, second and third control moment gyros and the rate of rotation of the spacecraft about the gimbal axis of one of the first second and third control moment gyros respectively; and feedback means connecting the each of the first, second and third control moment gyros to receive one of the tenth, eleventh and twelfth signals respectively for use in producing the first, second and third torques respectively.

12. The apparatus of claim 11 wherein the inertial sensors are laser angular rate sensors.

13. The apparatus of claim 11 wherein the spacecraft sensors further produce signals indicative of the angles between the first second and third predetermined axes and a reference axis and further including controller means receiving the signals indicative of the angles and receiving signals indicative of desired angles, the controller means operable to produce signals indicative of desired rates of rotation of the space craft about the gimbal axes of the first, second and third axes respectively and comparing means receiving the signals indicative of the desired rates and receiving the tenth eleventh and twelfth signal to produce first, second and third feedback signals, and wherein the feedback means connects each of the first, second and third control moment gyros to receive one of the first second and third feedback signals respectively for use in producing the first, second and third torques respectively.

14. The method of controlling the rate of rotation of a space craft about a predetermined axis which spacecraft includes inertial sensors operable to produce first signals indicative of the rate of rotation of the space craft about the inertial axes thereof and which utilizes control moment gyros to produce torque about the predetermined axis, comprising the steps of A. producing second signals indicative of the rate of rotation of the gimbals of the control moment gyros about the gimbal axes thereof;

B. producing third signals from the first signals, the third signals indicative of the rate of rotation of the spacecraft about the gimbal axes;

C. comparing the second and third signals to produce fourth signals indicative of the relative rate of rotation of the gimbals and the spacecraft about the gimbal axes;

D. comparing the fourth signals with fifth signals indicative of the desired relative rate of rotation of the gimbals and the spacecraft about the gimbal axes to produce feedback signals; and E. providing the fifth signals to the control moment gyros to produce the torque.

* * * * *